Feb. 19, 1952     O. M. WHITTEN     2,586,449

LIQUID LEVEL INDICATOR

Filed June 6, 1949

*INVENTOR.*
OWEN M. WHITTEN

BY

ATTORNEYS

Patented Feb. 19, 1952

2,586,449

UNITED STATES PATENT OFFICE 2,586,449

LIQUID LEVEL INDICATOR

Owen M. Whitten, Detroit, Mich., assignor to Kelsey-Hayes Wheel Company, Detroit, Mich., a corporation of Delaware Application June 6, 1949, Serial No. 97,406

2 Claims. (Cl. 200—84)

The invention relates to liquid level indicators and refers more particularly to devices for indicating the level of braking liquid in the reservoir of a master cylinder.

The invention has for one of its objects to provide a simple construction of liquid level indicator which may be economically manufactured.

The invention has for another object to provide a liquid level indicator having a float, movable within a chamber and engageable with a contact at the lower end of the chamber, having a restricted passage for liquid into the chamber to thereby check surge of the liquid.

With these and other objects in view, the invention resides in the novel features of construction and combinations and arrangements of parts as more fully hereinafter set forth.

Figure 2:
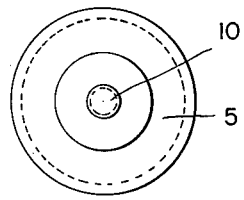
Figures 2 and 3 are top and bottom views respectively of the indicator.
Figure 1:
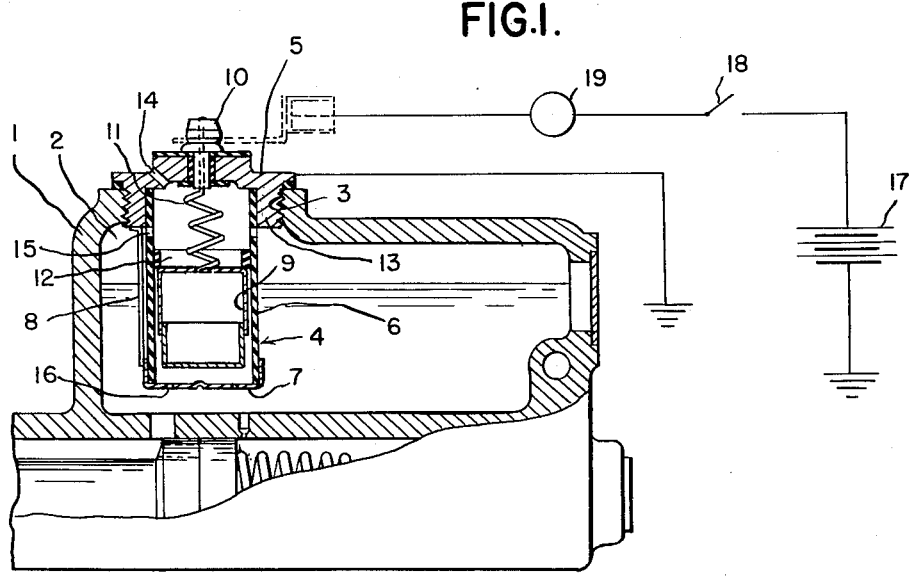
Figure 1 is a vertical section through a liquid level indicator embodying the invention and a diagrammatic view of an electric circuit with which the indicator is associated.
Figure 3:
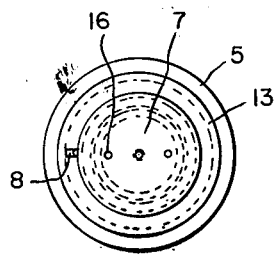

The liquid level indicator as shown is associated with a conventional master cylinder 1 of a hydraulic brake system. The master cylinder comprises a cylinder having a port at one end communicating with the tubing leading to the wheel cylinders and a port in its upper wall placing the cylinder in communication with the reservoir 2 of the master cylinder when the piston is in retracted position. The reservoir has the fill opening 3 in its upper wall for the braking liquid. 4 is the indicator comprising the electrical conducting body 5 closing the fill opening, the insulator tube secured to and depending from the body, the electrical conducting contact 7 extending over the lower end of the tube and the electrical conducting wire 8 secured to the body and the contact and extending over the outer side of the tube. The indicator also comprises the electrical conducting float 9 located within and guided by the tube, the electrical conducting terminal 10 mounted on and insulated from the body 5, and the flexible electrical conducting wire 11 secured to the float and terminal. Upward movement of the float is limited by the ring 12 within and secured to the tube and providing a shoulder for engagement by the float.

The body 5 has the externally threaded nipple 13 for threadedly engaging the wall of the fill opening and is provided with the air vent 14. The tube 6 is provided with air vents 15 in its upper portion and below the nipple 13. The contact 7 is in the nature of a disk telescoped over the lower end portion of the tube 6 and this disk is provided with the restricted holes 16 providing for the passage of the braking liquid into the tube but preventing objectionable surge of the braking liquid within the tube. The wire 8 is connected to the contact 7 and the nipple 13 of the body, preferably by solder, as it also the case with the connection of the wire 11 to the float 9 and terminal 10.

As indicated diagrammatically, the contact 7 and terminal 10 are included in an electrical circuit having the battery 17 of the motor vehicle, one side of which is grounded as is also the body 5 of the indicator. The other side of the battery is adapted to be connected through the switch 18 to the light 19 which in turn is connected to the terminal 10. The switch is the conventional ignition switch of the motor vehicle.

In operation when the level of the braking liquid in the reservoir 2 of the master cylinder is relatively high and with the ignition switch 19 closed, the braking liquid maintains the float 9 in raised position and out of engagement with the contact 7. However, should the level of the braking liquid in the reservoir lower to a predetermined extent the float 9 engages the contact 7 and thereby completes the electric circuit to illuminate the light 19.

What I claim as my invention is:

1. A liquid level indicator comprising an electrical conducting body, an insulator tube depending from said body, an electrical conducting float vertically movable within said tube, an electrical conducting contact extending over the lower end of said tube and having a restricted passage for liquid, means for electrically connecting said body and contact, an electrical conducting terminal mounted on and insulated from said body and flexible means for electrically connecting said float and terminal.

2. A liquid level indicator comprising an electrical conducting body for closing the fill opening in the top wall of the reservoir of a master cylinder, an insulator tube depending from said body into the reservoir, an electrical conducting float vertically movable within said tube, a ring within said tube for limiting upward movement of said float, an electrical conducting contact extending over the lower end of said tube and having restricted holes for the passage of the braking liquid in the reservoir, means outside said tube for electrically connecting said body and contact, an electrical conducting terminal mounted on and insulated from said body and a flexible wire for electrically connecting said float and terminal.

OWEN M. WHITTEN.

REFERENCES CITED

The following references are of record in the file of this patent:

UNITED STATES PATENTS

| Number | Name | Date |
|---|---|---|
| 428,688 | Morehead | May 27, 1890 |
| 912,970 | Marsh | Feb. 16, 1909 |
| 980,214 | Bisschop | Jan. 3, 1911 |
| 1,246,757 | Knowles | Nov. 13, 1917 |
| 1,291,858 | Hanna | Jan. 21, 1919 |
| 1,802,124 | Phifer | Apr. 21, 1931 |
| 2,253,260 | Alcorn | Aug. 19, 1941 |